INVENTORS
JOHN V. PETRIELLO
MICHAEL LA TORRA

United States Patent Office 3,502,498
Patented Mar. 24, 1970

3,502,498
METAL-FLUOROCARBON ADHERENT COMPOSITE STRUCTURES AND PROCESS FOR PREPARING SAME
John V. Petriello and Michael La Torra, Babylon, N.Y., assignors, by mesne assignments, to Dielectrix Corporation, Farmingdale, N.Y., a corporation of Delaware
Filed Aug. 18, 1967, Ser. No. 661,702
Int. Cl. B44d 1/14; B32b 15/08
U.S. Cl. 117—75                               6 Claims

ABSTRACT OF THE DISCLOSURE

A composite thin flexible metal-fluorocarbon polymer fused multi-layered laminate comprising interlayers of mixtures of melt-fusible copolymer of tetrafluoroethylene (FEP) and sinterable polytetrafluoroethylene (TFE) in consequent layers starting from a high FEP content adjacent to a metal substrate on at least one side followed by decreasing ratio FEP/TFE layers to provide at least one interlayer of substantially all-TFE.

---

Figure 1:
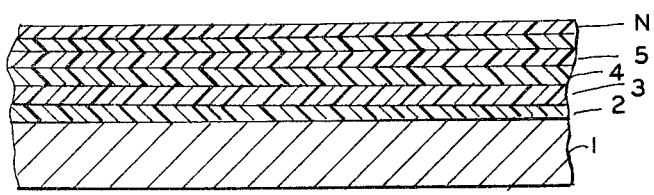

This invention relates to a composite laminate comprising thin flexible metal foils with adherent fluorocarbon polymer layers rendered particularly contiguous for flexural durability. The invention is directed toward providing a flexible construction of fluorocarbon polymer with a metal barrier serving to decrease the permeation of liquids and gases while at the same time providing flexural durability and integrated non-delaminating construction.

It is well established that fluorocarbon polymers as described in this invention are endowed with high degree of chemical resistance and are practically insoluble in commonplace solvents in contrast to polymers corresponding to their chlorine and hydrocarbon analogs in which the fluorocarbon is partially replaced by chlorine or hydrogen. The fluorocarbon polymers including copolymers with several homologs are also unique for their high melting points up to 327° C. for the homopolymer of tetrafluoroethylene. They are also outstanding in low temperature applications, down to liquid helium. Hence they should be highly useful for handling or containing and transferring corrosive liquids, solvents and chemical mixtures in a broad range of temperatures down to cryogenic levels.

However, the fluorocarbons have two significant shortcomings that deter from exploiting this usefulness. First, the fluorocarbon polymers and copolymers lack structural rigidity having a modulus range at room temperature that provides only a semi-rigid quality. Secondly, the fluorocarbon polymer, especially the homopolymers are permeable to liquids and gases and in many instances the permeation is significantly higher than that of the more common hydrocarbons and analogous chloropolymers. Consequently, the utility of the fluorocarbon in lower permeability or impermeable construction has been limited if not excluded because of this permeation.

Additionally, attempts to correct the permeation by means of metal barriers while adequate in rigid non-flexing constructions as topical coatings have proven inadequate especially in flexible constructions for reasons of inadequate interlaminar contiguity and bonding. This shortcoming has been overcome through novel compositions of fluorocarbon polymers applied in a regulated critical ratio.

It is a principal object of this invention to provide fluorocarbon-metal composite layered constructions which assure a contiguous adherent laminate capable of withstanding requisite permeation and flexure.

It is a further object of this invention to provide critical and optimum ratios of melt-fusible and sinterable fluorocarbon polymers as base interlayers between the metal substrate and the ensuing fluorocarbon construction.

Another object of the invention is to provide layered compositions of selected ratios of melt fusible copolymer of tetrafluoroethylene and polytetrafluoroethylene that will assure metal substrate contiguity against permeation and flexure.

Still another object is to provide methods of applying the ratios to include an ultimate top composition of substantially polytetrafluoroethylene.

Figure 2:
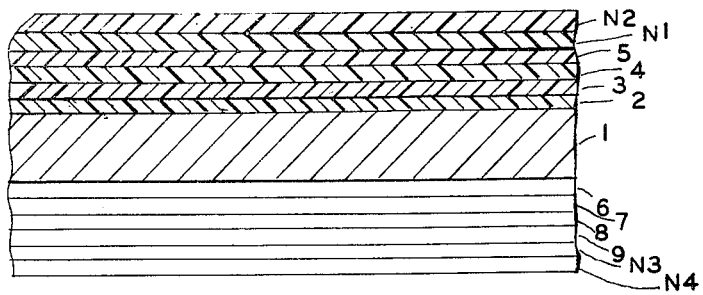
Figure 3:
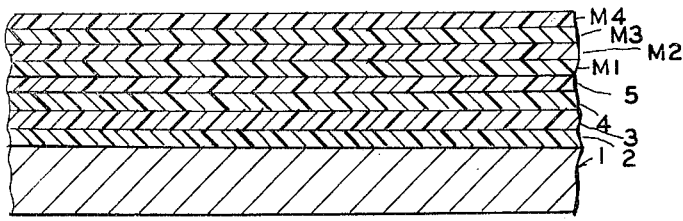

These and other objects will be apparent from the following specification and drawings of which, FIGURES 1, 2, and 3 are cross sectional views of embodiments of the invention.

These objects are accomplished by applying aqueous dispersions of the copolymer of tetrafluoroethylene and the homopolymer of tetrafluoroethylene employing either spray-coating or dip casting techniques followed by a specified sequence of drying to eliminate the water and added wetting agents followed by selective melt-fusion and sintering at defined temperature conditions.

FIGURE 1 illustrates the basic sequence of the fluorocarbon copolymer and polymer mixtures on the thin flexible metal substrate 1 in which the adjacent fluorocarbon layer 2 is either substantially melt-fusible copolymer of polytetrafluoroethylene with or without a minor proportion of higher melting sinterable homopolymer of tetrafluoroethylene, followed by consecutive layers 3, 4 in which the ratio of the copolymer to the homopolymer decreases until the $n$th layers with substantially homopolymer interlayer or interlayers are attained according to the ensuing process details. FIGURE 1 illustrates the construction over one side of the metal substrate 1 serving as permeation barrier.

FIGURE 2 involves the same sequence as described for FIGURE 1 except that the layers 2 to N2 and 6 to N6 of the varying ratios of the melt fusible copolymer and sinterable homopolymer are applied in both sides of the metal substrate 1 serving as the permeation barrier. N1, N2, N3 and N4 are substantially homopolymer layers.

FIGURE 3 illustrates another modification of layers 2 to M4 in which the melt-fusible copolymer is made both the substrate adherent layer 2 as well as the top layer M4 for adherence to other metal surfaces, one reason being that the homopolymer can be put on in sequence of coatings at several times the critical thickness of the copolymer. M1, M2 and M3 are substantially homopolymer layers.

The effective, contiguous bonding between the metal substrate 1 and the adjacent fluorocarbon layer, made durable to withstand flexure and crimping, has been discovered as a selective or critical admixture of the two general classes of fluorocarbon polymers, one being a melt-fusible copolymer and the other a sinterable polymer. The descriptive term fluorocarbon refers to structures comprising carbon-fluorine generally and includes those involved in intra-linear, continuous chain, or extralinear configuration.

The melt-fusible copolymers serve as an essential function of coalescing by substantially or entirely viscous flow and are usually in the viscosity range up to $10^6$ poises as measured in conventional melt rheometer. Such copolymers are made from tetrafluoroethylene by copolymerizing with homologous fluoro-alkylenes including phenyl, oxygen, sulfur, nitroso, and similar substituents. A typical example is hexafluoropropylene described in U. S. Patents 2,549,935 and 2,946,763, and available as proprietary copolymer commercially known as "Teflon" FEP (fluorinated ethylene propylene) resin, a product of E. I. du Pont de Nemours and Company, Inc., hereinafter called FEP copolymer. It is available as molding powder, film, and in the form of aqueous dispersion stabilized with a surface-active agent and melts up to 50 degrees or more lower than that of the homopolymer (327° C.). The dispersion comprising particles in the range of 0.05 to 0.1 micron is used in the preparation of the thin flexible metal fluorocarbon laminate of this invention. Its application to the metal substrate by dipping or casting according to the technique described in U. S. Patent 2,852,811 but with only a limited thickness nominally not over 0.2-mil (1 mil=1/1000 inch) beyond which the deposition forms microscopic and visible cracks and discontinues. This level of thickness, termed critical thickness as described by Lontz in Industrial and Engineering Chemistry, vol. 44, p. 1803 (Determination of Critical Thickness) 1952. The melt-fusible copolymer serves some unique feature, that is not clearly discernible despite its limited applicability within the critical thickness, in bonding to metal subtrates described herein and secondly to decrease and improve upon the high permeability of the homopolymer. It is indispensible in building up to the homopolymer interlayer as described in the ensuing discussion, by incremental, progressive ratios of FEP to the tetrafluoroethylene homopolymer.

The polytetrafluoroethylene homopolymer hereinafter called TFE polymer described in the Lontz article does not melt in the viscous sense. It is endowed with a viscosity many orders higher than that of the FEP copolymer (up to 10) and measures in the region up to $10^{10}$ poises and undergoes a crystalline transition at 327° centigrade, 50 degrees more than that of the typical copolymers. As a consequence the homopolymer acquires a somewhat elastic characteristic and a restraint against viscous flow. Hence in present technology, the homopolymer is fused more by a sintering process in which time-dependent elastic retardation imposes a requirement of larger sintering time to effect complete consolidation. At best only partial consolidation is achievable which accounts for the much higher permeability of the homopolymer. Hence as an impermeable or low permeability container it has little or no utility. However, by virtue of its higher temperature transition along with higher flexural endurance and resistance to environmental cracking in organic liquids, it is still an indispensible component in chemically-resistant metal-fluorocarbon composite laminates. Moreover, the critical thickness of TFE dispersion is several times higher than that of the FEP dispersion allowing appreciably higher thicknesses to be built up with each cycle of application. By selective and proper adjustments of the TFE/FEP ratios starting from the metal substrate boundaries it has been found possible to devise a critical, optimal array such as shown in FIGURES 1, 2 and 3 to produce a superior engineering material.

As the metal substrate a variety of thin materials have been used that include aluminum, copper, silver, nickel, chromium and their various alloys and mixtures melting above the melting and sintering point of the fluorocarbon layers. For the barrier purposes it is preferred to use the softest possible materials notably aluminum which is also one of the cheapest. A thickness limitation of 2.0 mils is preferred, although contoured and variable thicknesses higher than this limit can be used where non-flexing sections are involved. It has also been found that pre-annealed metal substrates are desired to lessen the stiffness and to work the metal-fluorocarbon laminate into other shapes or to permit collapsing when used as expulsion containers.

EXAMPLE I

The following series of FEP and TFE aqueous dispersions and codispersions are applied by spray-coating from a pressure nozzle onto an annealed 18-inch wide by 0.25 mil thick aluminum foil or sheeting running continuously against the broad spraying area regulated to provide a layer not exceeding the critical thickness of the respective FEP copolymer and TFE homopolymer. After each spray application the spray coated aluminum is passed through a drying tower and then through a melt zone or sintering zone.

TABLE I.—COATED 0.25 MIL ALUMINUM BASE

| Coating layer (Fig. 1) | Polymer | Percent solids | Number of coats | Thickness (mils) | Melting or sintering range (° C.) |
|---|---|---|---|---|---|
| 2 | FEP | 36 | 2 | 0.24 | 255–295 |
|   | TFE | 0 |   |   |   |
| 3 | FEP | 24 | 2 | 0.64 | 285–300 |
|   | TFE | 12 |   |   |   |
| 4 | FEP | 12 | 2 | 1.22 | 300–340 |
|   | TFE | 24 |   |   |   |
| 5 | FEP | 0 | 2 | 1.64 | 340–380 |
|   | TFE | 36 |   |   |   |

See the following table:

| | Mil |
|---|---|
| Fluorocarbon thickness (app.) | 4.00 |
| Aluminum foil substrate | 0.25 |
| Total composite thickness | 4.25 |

The FEP aqueous dispersion used was the Du Pont Teflon 120 FEP fluorocarbon 60 percent solids diluted to the indicated solids and admixed with 3–10 percent xylene and an additional quantity of Triton X 100 surfactant (product of Rohm & Haas Chemical Co., Philadelphia, Pa.) to stabilize against coagulation, and co-mixed in the indicated proportions.

The TFE aqueous dispersion used was the Du Pont "Teflon" 30 fluorocarbon resin at nominally 60 percent solids level with 6 percent added Triton X 100.

This metal-fluorocarbon composite construction passed a proprietary requirement test, for an article of commerce of 1000 flexures of a ½-inch wide by 2-inch long test strip followed by immersion in dimethylhydrazine cycled between 25° C. and −45° C. for 100 cycles. The strips rated for (a) delamination and (b) blisters should complete absence of these disqualifying features in contrast with 4-mil FEP melt fused onto 0.25 mil aluminum foil which failed this test with visible delamination after 30–150 flexures precluding any immersion testing. Another equivalent composite metal-fluorocarbon strip comprising 4-mil TFE applied to acid primer barely passed the initial 1000-flexure but developed severe blisters in the cyclic test. It became evident that the coating layer sequence indicated in the above table furnished the required optimization of flexurally durable TFE and highly impermeable FEP layers under the melting and sintering conditions indicated in the above tabulation.

EXAMPLE II

A series of FEP and TFE coatings similar to that described in Example I were applied by casting from dip coating to produce a composite laminate over 0.5 mil annealed aluminum shown in FIGURE 2 according to the following tabulation.

TABLE II.—COATED 0.5 MIL ALUMINUM BASE

| Coating layer, Figure 2 | Polymer | Percent solids | Number of coatings | Thickness, mils | Melting or sintering range |
|---|---|---|---|---|---|
| and 6 | FEP | 36 | 1 | 0.16 | 250–290 |
|   | TFE | 0 |   |   |   |
| 3 and 7 | FEP | 24 | 1 | 0.20 | 260–300 |
|   | TFE | 12 |   |   |   |
| 4 and 8 | FEP | 12 | 1 | 0.24 | 280–320 |
|   | TFE | 24 |   |   |   |
| 5 and 9 | FEP | 6 | 1 | 0.40 | 300–340 |
|   | TFE | 30 |   |   |   |
| n and n' | FEP | 0 | 1 | 0.75 | 340–380 |
|   | TFE | 42 |   |   |   |
| n and n' | FEP | 0 | 1 | 0.75 | 340–380 |
|   | TFE | 42 |   |   |   |

See the following table:

| | Mil |
|---|---|
| Fluorocarbon thickness | 5.00 |
| Aluminum barrier substrate | 0.50 |
| Total composite thickness | 5.50 |

This particular construction proved particularly useful in conforming the composite to 90-degree bends in a chamber radius as low as ⅛-inch for preparing flanged ends from circular gaskets to pass a stringent test of exposure to kerosene and other petroleum fractions. An equivalent structure made by melt pressing extruded FEP films on both sides of the foil failed by some solvent strain effect.

EXAMPLE III

The metal-fluorocarbon composite described in Example II is extended to a series of 0.25 mil metal substrated for durability in cryogenic (liquid nitrogen immersion) using crimped, two-way 90 degree folds, made by hand, followed by immersion in nitrogen dioxide for signs of permeation and penetration to the inner layer of the thin metal foil, compared to equivalent FEP film applied by hot, melt pressing (MP).

TABLE III.—COATED METAL IMMERSION TEST

| Metal substrate | Method of compositing | Test inspection for metal attack | | |
|---|---|---|---|---|
| | | 1 day | 10 days | 30 days |
| Aluminum | Example II | P | P | P |
| | (MP) | P | F | |
| Copper | Example II | P | P | P |
| | (MP) | P | P | F |
| Silver | Example II | P | P | P |
| | (MP) | F | | |
| Nickel | Example II | P | P | P |
| | (MP) | F | | |

P—Pass.  F—Fail.  MP means melt pressing 300–310° C.

The above tests indicate the marked superiority of dispersion applied progressive FEP–TFE in providing a crimp-resistant construction compared with conventional melt-lamination.

Numerous modifications of the sequence of FEP and TFE can be applied to include as shown in FIGURE 3 a top layer of FEP which can be further bonded in less critical endurance requirements by virtue of the available melt-fusion layer. This can be achieved by both spray-coating and by dip-casting, the former being preferred in some instances for shaped objects.

The laminate constructions made with the annealed metal substrates are useful in limited shaping or conforming operations such as making cupped objects, flanged ends, and accordion-pleated arrangements.

Numerous fillers and additives can be incorporated in the intervening layers indicated in FIGURES 1, 2 and 3. These may include silica for hardening and resisting cut-through, asbestos for reserve strength in ablative applications, titanium dioxide for additional thermal reflection, graphite or carbon black for decreasing topical resistivity, and many other diverse materials.

The copolymer indicated above represents a typical commercially available melt-fusible co-material made from hexafluoropropylene. Other copolymers fulfilling the requirement of viscous melt-fusion are aqually applicable and can be adapted to the processes indicated in the above examples by suitable co-dispersions.

We claim:
1. A composite thin flexible metal-fluorocarbon polymer fused multi-layered laminate comprising interlayers of mixtures of melt-fusible copolymer of tetrafluoroethylene and sinterable polytetrafluoroethylene in consequent layers starting from a high melt-fusible copolymer content adjacent to a metal substrate on at least one side followed by decreasing ratio of said melt-fusible copolymer to sinterable polytetrafluoroethylene layers to provide at least one interlayer of substantially all sinterable polytetrafluoroethylene.

2. The composite thin flexible metal-fluorocarbon polymer, fused multi-layered laminate of claim 1 in which the melt-fusible copolymer is hexafluoropropylene-tetrafluoroethylene.

3. The composite thin flexible metal-fluorocarbon polymer, fused multi-layered laminate of claim 2 using metal substrates in thickness not exceeding two one-thousandths of an inch thick.

4. The composite thin flexible metal-fluorocarbon polymer fused multi-layered laminate of claim 3 using an annealed ductile metal substrate.

5. The composite thin flexible metal-fluorocarbon polymer fused multiple-layered laminate of claim 4 comprising aluminum composition substrates.

6. A process for preparing thin flexible metal-fluorocarbon polymer, fused multiple-layered laminate comprising the step of coating a metal with a plurality of successive layers of aqueous dispersions of melt-fusible fluorocarbon and sinterable polytetrafluoroethylene which vary in ratio from high melt-fusible tetrafluoroethylene copolymer to incrementally increased ratios of sinterable polytetrafluoro - ethylene melt - fusible tetrafluoroethylene copolymer, drying and heat treating of each layer to effect interlayer fusion of each layer before the application of the next layer.

References Cited

UNITED STATES PATENTS

| | | | |
|---|---|---|---|
| 2,777,783 | 1/1957 | Welch. | |
| 2,825,706 | 3/1958 | Sanders | 117—75 X |
| 2,833,686 | 5/1958 | Sandt | 161—189 X |
| 2,944,917 | 7/1960 | Cahne | 117—75 X |
| 2,989,433 | 6/1961 | Yuan | 161—189 X |
| 3,136,680 | 6/1964 | Hochberg | 117—75 X |
| 3,194,428 | 7/1965 | Dereich. | |

WILLIAM D. MARTIN, Primary Examiner

R. HUSACK, Assistant Examiner

U.S. Cl. X.R.

117—132, 68; 161—189